(12) United States Patent
Wilt

(10) Patent No.: US 6,966,502 B2
(45) Date of Patent: Nov. 22, 2005

(54) ALL TERRAIN VEHICLE CHEMICAL APPLICATOR

(76) Inventor: H. William B. Wilt, P.O. Box 1665, Valleyview, Alberta (CA) T0H 3N0

(*) Notice: Subject to any disclaimer, the term of this patent is extended or adjusted under 35 U.S.C. 154(b) by 0 days.

(21) Appl. No.: 10/621,706

(22) Filed: Jul. 17, 2003

(65) Prior Publication Data

US 2004/0011884 A1     Jan. 22, 2004

(30) Foreign Application Priority Data

Jul. 22, 2002  (CA) .................................. 2394366

(51) Int. Cl.$^7$ ...................... A01G 25/09; B62D 21/11; B60G 17/01
(52) U.S. Cl. ...................... 239/172; 239/160; 239/164; 280/124.19; 280/124.116; 280/5.5
(58) Field of Search ............................. 239/172, 723, 239/726, 728, 722, 159, 160, 161, 164; 280/124.157, 280/124.109, 124.116, 5.5, 5.515

(56) References Cited

U.S. PATENT DOCUMENTS

| | | | | |
|---|---|---|---|---|
| 3,447,750 | A | * | 6/1969 | Weston ........................ 239/167 |
| 4,236,591 | A | | 12/1980 | Molby .......................... 180/41 |
| 4,241,803 | A | | 12/1980 | Lauber ........................ 180/8 R |
| 4,265,326 | A | | 5/1981 | Lauber ........................ 180/8 R |
| 4,271,918 | A | | 6/1981 | Molby .......................... 180/6.48 |
| 4,515,311 | A | * | 5/1985 | Takata ......................... 239/172 |
| 4,815,756 | A | | 3/1989 | Kitner ......................... 180/215 |
| 4,964,480 | A | | 10/1990 | Kopczynski ................. 180/22 |
| 6,036,417 | A | | 3/2000 | Weaver .......................... 410/7 |
| 6,086,077 | A | * | 7/2000 | Stuart ................... 280/124.116 |
| 6,203,039 | B1 | * | 3/2001 | Gorden ................ 280/124.157 |
| 6,234,407 | B1 | * | 5/2001 | Knight et al. ............... 239/163 |
| 6,299,181 | B1 | * | 10/2001 | Ericksson ................. 280/6.156 |
| 6,328,323 | B1 | | 12/2001 | Elser .................... 280/124.152 |

FOREIGN PATENT DOCUMENTS

| | | | | |
|---|---|---|---|---|
| CA | 2280540 | | 2/2000 | .......... B60G 25/00 |
| FR | 2 547 261 | | 12/1984 | .......... B62D 33/02 |
| FR | 2 579 147 | | 9/1986 | ............. B60P 3/22 |
| FR | 2 640 206 | | 6/1990 | .......... B60G 23/00 |
| FR | 2 688 184 | | 9/1993 | .......... B62D 51/00 |

(Continued)

OTHER PUBLICATIONS

Timberking LF 14, Revolutionary Design with Enequalled Manoeuverability, http://www.tiger.com.au/downloads/lf14brochure.pdf 4 pages.

Primary Examiner—David A. Scherbel
Assistant Examiner—Seth Barney
(74) Attorney, Agent, or Firm—Davis & Bujold, P.L.L.C.

(57) ABSTRACT

An all terrain vehicle chemical applicator includes an elongate frame having at least six independent support wheels positioned along opposed sides of the frame. Suspension is provided for each of the support wheels including a support pivotally mounted to the frame. A shock absorber is disposed between each support and the frame to absorb shocks as the supports are forced to adjust to variations in terrain. A chemical applicator mounting platform is pivotally secured to the frame on which are mounted chemical applicators. Telescopic control cylinder are provided to position the chemical applicator mounting platform in an operator selected orientation relative to the terrain. An automatic motion dampening control system is provided for controlling the telescopic control cylinders to automatically reposition the chemical applicator mounting platform to dampen disruptive motions and average surface roughness oscillations that can not be dampened by the suspension.

14 Claims, 6 Drawing Sheets

FOREIGN PATENT DOCUMENTS

| | | | | |
|---|---|---|---|---|
| GB | 2 030 528 A | 4/1980 | .......... | B62D 53/00 |
| SE | 501606 | 3/1995 | .......... | B60G 21/06 |
| WO | 88/00900 | 2/1988 | .......... | B62D 21/18 |
| WO | 90/11903 | 10/1990 | .......... | B60G 21/04 |
| WO | 91/01241 | 2/1991 | .......... | B62D 49/08 |
| WO | 92/19337 | 11/1992 | ............ | B62D 9/02 |

* cited by examiner

ALL TERRAIN VEHICLE CHEMICAL APPLICATOR

FIELD OF THE INVENTION

The present invention relates to an all terrain vehicle chemical applicator

BACKGROUND OF THE INVENTION

There are many instances in which it is desirable to apply chemicals to range and pasture land. These chemicals may be in either wet or dry form. The purpose of the chemicals may be to fertilize the soil, treat insect infestations, treat weed infestations, or for some other purpose, such as killing all vegetation in preparation for cultivating and reseeding.

For example, infestations of weeds and woody vegetation regrowth in rangeland rob the soil of moisture and consume nutrients required by more desirable feed grasses. It is, therefore, generally considered to be advisable to control weeds and woody vegetation regrowth with a program of chemical spraying. With large tracts of rangeland, this chemical spraying can be accomplished effectively of aerial spraying using aircraft. For a variety of reasons it is often not viable to use aerial spraying with small rangeland plots. Cost is always a factor, as aerial spraying tends to be relatively expensive. Aerial access is often a factor, as the presence of natural or man-made obstacles in the vicinity of the small rangeland plot may prevent an aircraft from making a low level approach. Environmental concerns are sometimes a factor, as the rangeland may be positioned adjacent to bodies of water which could become contaminated through aerial spraying. Population concentrations are sometimes a factor, as acreage residences have extended out into rangeland areas as a result of urban sprawl. A further limitation is wind conditions. Chemical applicators which travel along the ground can work in a broader range of wind conditions due to the fact that the spray is released closer to the target surface then in aerial applications. There is, therefore, a need for an all terrain vehicle chemical applicator unit which can travel over rugged rangeland.

There are all terrain vehicles which are used on rangeland for other agricultural applications. An example of such an all terrain vehicle is Application PCT/GB90/01090 filed under the provisions of the Patent Cooperation Treaty and published as WO 91/01241 (Auty 1991). What sets a chemical applicator application apart from other agricultural applications is the effect that movement can have on spray dispersal patterns. With boom sprayers, 60 to 100 foot booms extend 30 to 50 feet from each side of the all terrain vehicle. Any change of direction, when transmitted the length of a 60 to 100 foot boom results in a destructive whipping action that damages the boom and disrupts dispersal patterns. With boomless sprays, spray nozzles must eject droplets over a distance. Any disruption in the "plane of ejection" causes droplets to either leave gaps, or collide in mid-air. Colliding droplets do not maintain their original size. This results in spray becoming uneven. Droplets which become too large after colliding, tend to bead and run off the plants leaves. Droplets which become too small after colliding, tend to hang in the air leading to off-target chemical drift.

SUMMARY OF THE INVENTION

What is required is an all terrain vehicle chemical applicator.

According to the present invention there is provided an all terrain vehicle chemical applicator which includes an elongate frame having at least six independent support wheels positioned along opposed sides of the frame. At least four wheels are always in contact with the ground to support the frame. Suspension is provided for each of the support wheels including a support having a first end and a second end. The first end of the support is pivotally mounted to the frame. One of the support wheels is rotatably mounted to the second end of the support. At least one shock absorber is disposed between each support and the frame to absorb shocks as the supports are forced to adjust to variations in terrain. A chemical applicator mounting platform is pivotally secured to the frame on which are mounted chemical applicators. Means are provided to position the chemical applicator mounting platform in an operator selected orientation relative to the terrain. An automatic motion dampening control system is provided controlling the means provided to position the chemical applicator mounting platform to dampen disruptive motions and average surface roughness oscillations that can not be dampened by the suspension.

In order to be economically viable, the all terrain vehicle chemical applicator, as described above, must be capable of travelling over rough terrain at speeds of between 6 and 20 miles per hour carrying loads ranging from 8000 up to 16000 pounds. It must provide sufficient ground clearance to void ground obstructions while maintaining required dispersal height. It must do this while maintaining as stable an equipment platform as possible to facilitate the uniform dispersal of chemical, while minimizing undesirable motion which could damage equipment and disrupt the dispersal process. The all terrain vehicle chemical applicator, as described above, accomplishes this through a combination of features. The frame has at least six wheels with independent suspension. Whereas a four wheeled vehicle is sensitive to changes in elevation of one of the wheels, the six wheel vehicle provides a more stable platform as there are always at least four of the six wheels supporting the frame at any given time. The suspension on each wheel can accommodate a substantial range of movement through the use of pivotal supports. The movement of those pivotal supports is dampened by the use of shock absorbers. The chemical applicators are mounted on a platform. The orientation of this platform is adjustable, so the chemical applicators can be positioned in an operator selected orientation relative to the terrain. In addition, the platform has an automatic motion dampening control system which serves to dampen any motion that the suspension is unable to completely eliminate. The result is a remarkably stable environment for the chemical applicators, considering the nature of the terrain and the speed of travel.

In the description which follows the support is in the form of an arm. It will be appreciated, however, that a parallelogram-frame could also be used as a support. In the description which follows one form of automatic motion dampening control system is described, it will be appreciated that there are other automatic motion dampening control systems which could be used.

Beneficial results have been obtained in using air bags for the shock absorbers. In the description which follows dual air bag configurations are used. By arranging for fluid conduit between air bags, load can be transferred and distributed between air bags. For example, when two or more air bags along one of the opposed sides of the frame are in fluid communication, excess loading on one of the air bags can be transferred to other of the air bags along that opposed side. This manner of load redistribution works particularly well when each air bag has pre-selected minimum and maximum a load limits.

Another manner of absorbing shock loading is to equip all the wheels with floatation tires. Floatation tires are capable absorbing a portion of the impacts, so that there is less for the suspension and automatic motion dampening control system to handle.

In order to control clearance, it is preferred that a subframe member be pivotally mounted to the frame above each of the supports. The shock absorbers are disposed between the supports and the subframe member. A fluid activated telescopic preload cylinder is provided to act upon the subframe member to pivot the subframe member into a selected pivotal position, thereby setting basic ride height and clearance. This adjustment also alters weight distribution to some degree.

While the all terrain vehicle chemical applicator, as described above, can be made as a trailer which is hauled behind an all terrain tow vehicle, it is preferred that it be self-propelled. In order to turn the all terrain boom chemical applicator into a self-propelled vehicle, it is preferred that several of the wheels have independent hydraulic drive. In order to facilitate steering of this self-propelled all terrain vehicle chemical applicator, it is preferred that the frame have a front portion and a rear portion, with a pivoting joint being provided between the front portion and the rear portion. However, the pivoting joint should only accommodate pivotal movement about a substantially vertical pivot axis and not permit relative oscillation of the front portion and the rear portion.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
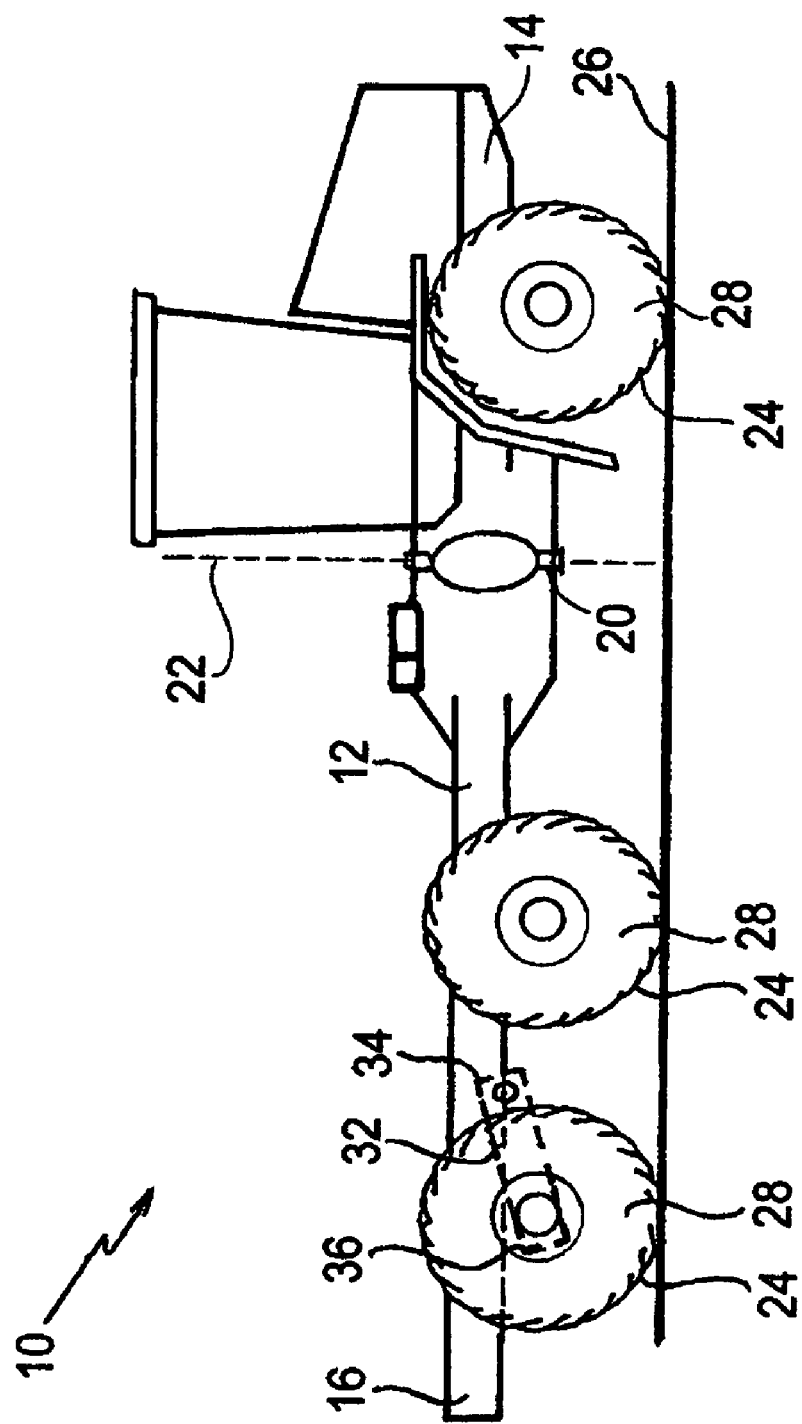
FIG. 1 is a side elevation view of an all terrain vehicle chemical applicator constructed in accordance with the teachings of the present invention.

The preferred embodiment, an all terrain vehicle chemical applicator generally identified by reference numeral 10, will now be described with reference to FIGS. 1 through 6.

Figure 2:
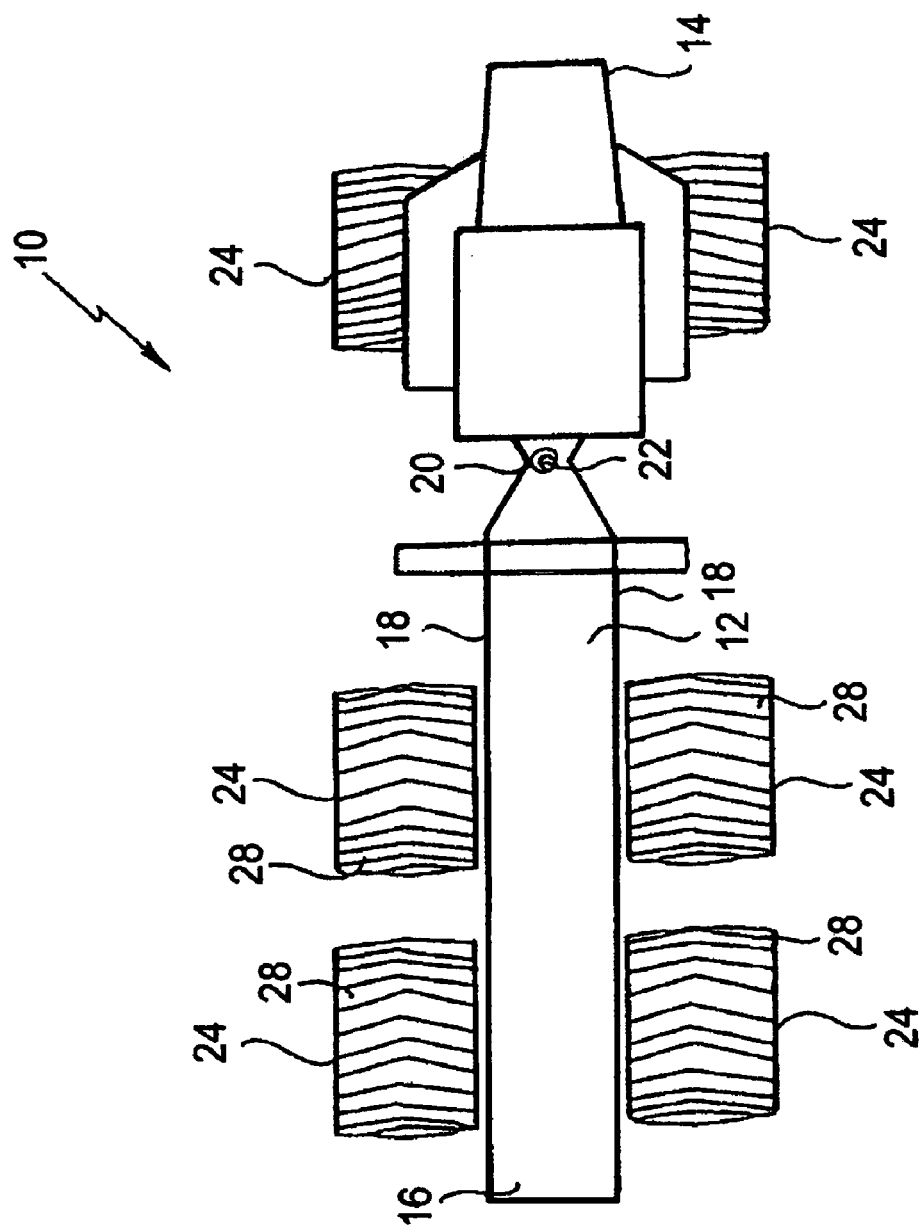
FIG. 2 is a top plan view of the all terrain vehicle chemical applicator illustrated in FIG. 1.
Figure 5:
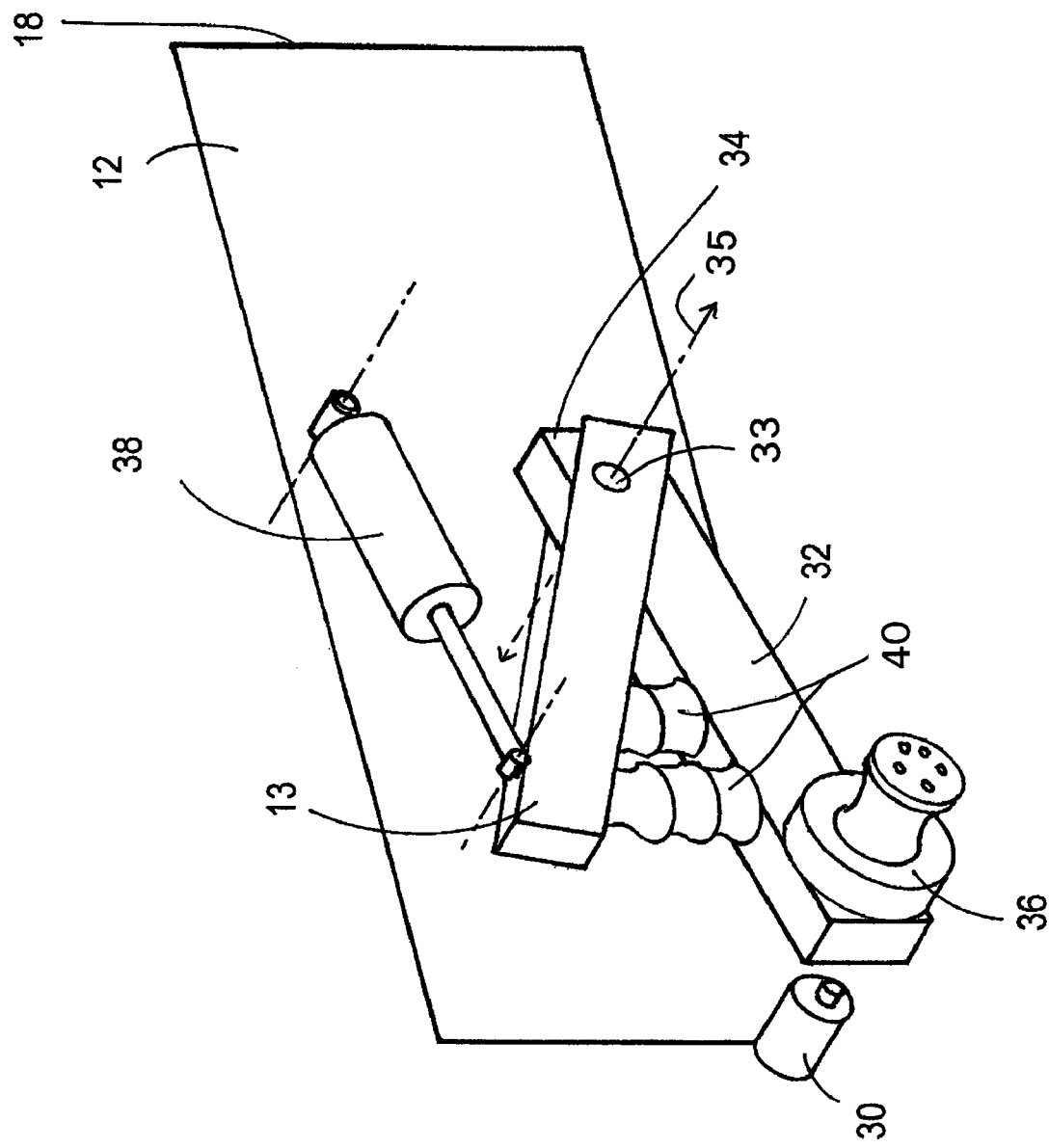
FIG. 5 is a detailed side elevation view of another embodiment of the rear suspension illustrated in FIG. 3.

Structure and Relationship of Parts:

Referring to FIG. 1, there is provided an all terrain vehicle chemical applicator 10, which includes an elongate frame 12. Referring to FIG. 2, elongate frame 12 has a front portion 14, a rear portion 16 and opposed sides 18. Referring to FIG. 5, subframe members 13 pivotally mounted to opposed sides 18 of frame 12. A pivoting joint 20 is provided between front portion 14 and rear portion 16. Referring to FIG. 1, pivoting joint 20 accommodates pivotal movement about a substantially vertical pivot axis 22, but does not permit relative oscillation of front portion 14 and rear portion 16. Referring to FIG. 2, six independent support wheels 24 are positioned along opposed sides 18 of frame 12, such that at least four of wheels 24 are always in contact with an underlying ground 26 illustrated in FIG. 1, to support frame 12. While the illustrated embodiment shows six wheels 24, it will be appreciated that frame 12 could have more than six wheels 24. In the illustrated embodiment, wheels 24 have flotation tires 28 which absorb impacts, but other type of tires could also be used.

Figure 4:
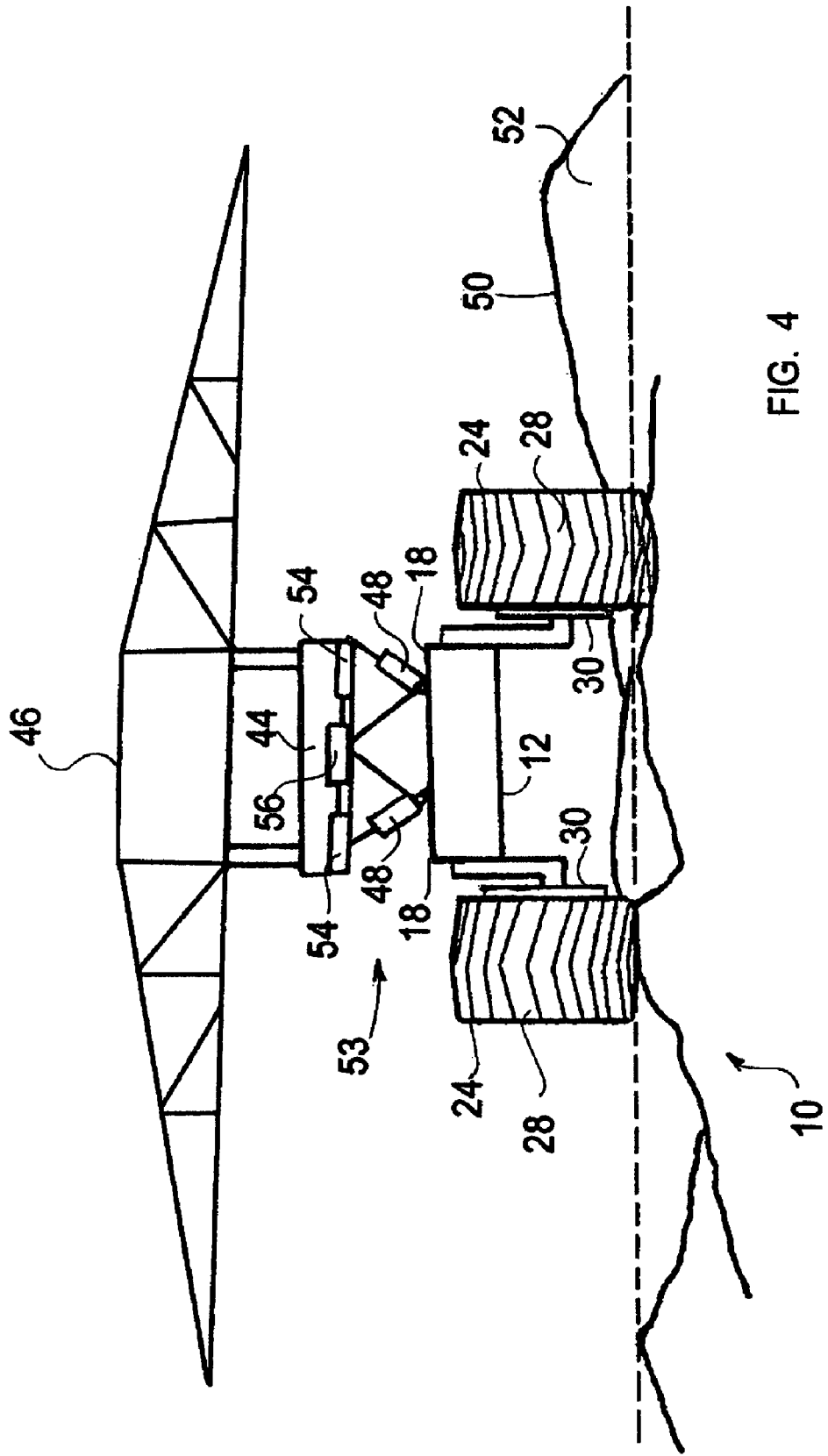
FIG. 4 is an end elevation view of the chemical applicator mounting platform for the all terrain vehicle chemical applicator illustrated in FIG. 1, in use with a boom sprayer.

Referring to FIG. 4, an independent hydraulic drive 30 is provided for several of support wheels 24. Referring to FIG. 1, suspension for each of support wheels 24 includes a support arm 32 which has a first end 34 and a second end 36. First end 34 of support arm 32 is mounted to frame 12 on a pivot 33, to pivot about an axis 35. One of support wheels 24 is rotatably mounted to second end 36 of each support arm 32. Referring to FIG. 5, dual air bag shock absorbers 40 are disposed between each of support arms 32 and subframe members 13, to absorb shocks as support arms 32 are forced to adjust to variations in terrain. Air bag shock absorbers 40 for one of support arms 32 is in fluid communication via a conduit 42 with air bag shock absorbers 40 for another of support arm s32 that is positioned along that same opposed side 18, such that excess loading on one of air bag shock absorbers 40 is transferred to another of air bag chock absorbers 40 along that opposed side 18. Each air bag shock absorber 40 has pre-selected minimum and maximum a load limits. Although the illustrated embodiment show air bag shock absorbers 40, it will be appreciated that other types of shock absorbers could be used instead. Referring to FIG. 5, hydraulic fluid activated telescopic preload cylinders 38 acts upon each of the rear subframe members 13 to pivot the rear subframe member 13 into a selected pivotal position, which sets basic ride height and clearance for each of support arms 32.

Referring to FIG. 4, a chemical applicator mounting platform 44 is positioned on frame 12. Chemical applicator booms 46 are mounted on mounting platform 44. Hydraulic fluid activated telescopic control actuators 48 are provided to position chemical applicator mounting platform 44 to maintain chemical applicator booms 46 in an operator selected orientation relative to the terrain. For example, the operator may desire an orientation parallel to a slope 50 of a hill 52 as frame 12 is traversed across a hill 52. An automatic motion dampening control system, generally indicated by reference numeral 53, is provided. Automatic motion dampening control system 53 includes a controller 56 coupled to telescopic control cylinders 48 and position sensors 54. Controller 56 receives input from position sensors 54 and activates telescopic control cylinders 48, as required, to constantly reposition chemical applicator mounting platform 44 to dampen disruptive motions that would otherwise travel along chemical applicator booms 46 and to average surface roughness oscillations that can not be dampened by the suspension.

Operation:

The use and operation of all terrain vehicle chemical applicator generally identified by reference numeral 10, will now be described with reference to FIGS. 1 through 5.

Referring to FIG. 1, all terrain vehicle chemical applicator 10, as described above is suitable for travelling along rugged terrain for the purpose of applying chemicals whether this be for the purpose of fertilizing the soil, controlling insects, controlling weeds, defoliating or for any other purpose. Transmission of the impact sustained by all terrain vehicle chemical applicator 10 as it moves along the rugged terrain is limited to minimize the possibility of damaging chemical applicator boom 46 and to ensure that dispersal patterns are not disrupted.

Referring to FIG. 2, all terrain vehicle chemical applicator 10 provides stability for chemical applicator boom 46 illustrated in FIG. 4. There are six wheels 24, two front and four rear wheels, each of which has independent suspension. At least four of the six wheels 24 are always in contact with ground 26 at any time. Wheels 24 have floatation tires 28 which are capable of absorbing a portion of the impacts.

Referring to another embodiment as seen in FIG. 5, hydraulic fluid activated telescopic preload cylinders 38 act upon each of the rear subframe members 13 to pivot the rear subframe member 13 into a selected pivotal position, which sets basic ride height and clearance for each of support arms 32.

Figure 3:
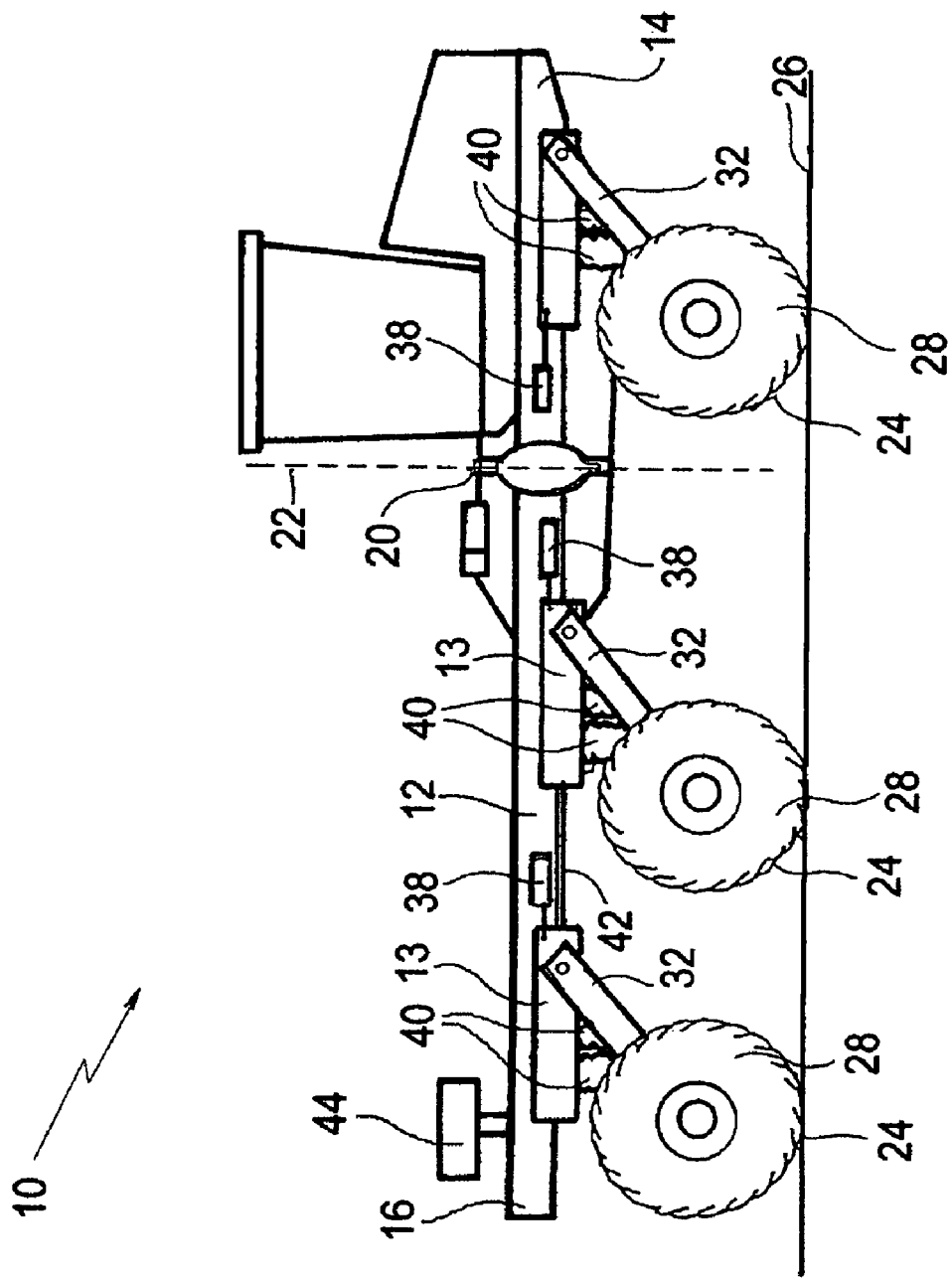
FIG. 3 is a detailed side elevation view of the suspension for the all terrain vehicle chemical applicator illustrated in FIG. 1.

Referring to FIGS. 1 and 3, support arms 32 on which wheels 24 are mounted can accommodate a substantial range of movement as all terrain vehicle chemical applicator 10 manoeuvres over irregular ground 26. Movement of support arms 32 is dampened by airbag shock absorbers 40. Furthermore, load distribution is enhanced with fluid communication between airbag shock absorbers 40 through conduit 42. As air bag shock absorbers 40 have pre-selected minimum and maximum load limits, excess load can be transferred to another of air bag shock absorbers 40 that is positioned on the same opposed side 18.

Referring to FIG. 4, as all terrain vehicle chemical applicator 10 travels on rugged terrain the operator selects the orientation of chemical applicator boom 46 by selectively activating telescopic control actuators 48. Any oscillations due to surface roughness that can not be dampened by the suspension, are dampened by automatic motion dampening control system 53. Controller 56 receives input from position sensors 54 and activates telescopic control cylinders 48, as required, to constantly reposition chemical applicator mounting platform 44. By constantly repositioning chemical applicator mounting platform 44, automatic dampening control system 53 dampens disruptive motions that would otherwise travel along chemical applicator booms 46.

Referring to FIG. 3, several of wheels 24 have independent hydraulic drive 30 so that all terrain vehicle chemical applicator 10 is self propelled. Pivoting joint 20 which is provided between front portion 14 and rear portion 16 facilitates steering of all terrain vehicle chemical applicator 10. In order to maintain maximum stability pivoting joint 20 only accommodates pivotal movement about substantially vertical pivot axis 22 and does not permit relative oscillation of front portion 14 and rear portion 16. While the all terrain vehicle chemical applicator 10 is described above as being self-propelled, it will be appreciated that it can also be made as a trailer which is hauled behind an all terrain tow vehicle.

Figure 6:
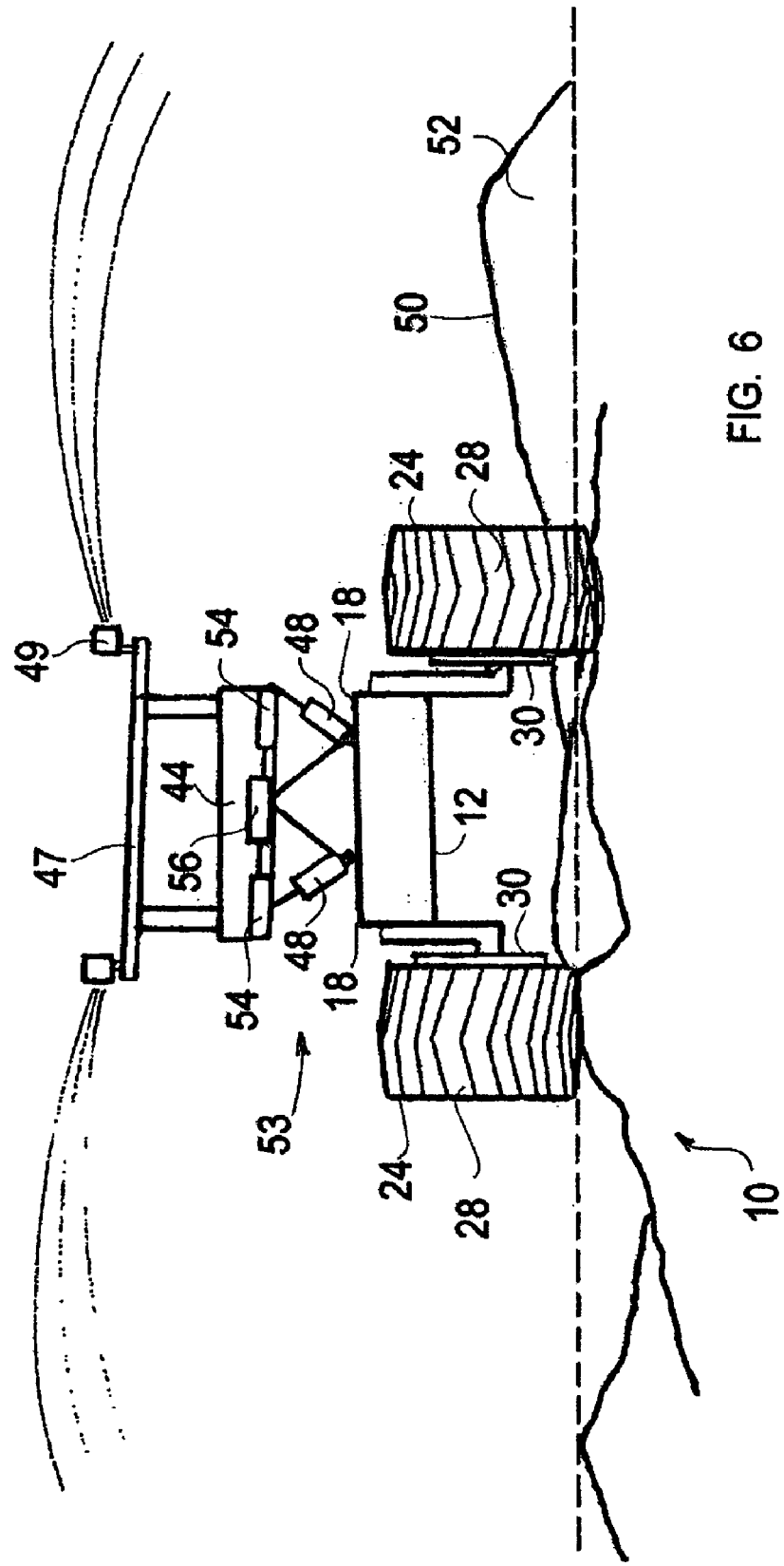
FIG. 6 is an end elevation view of the chemical applicator boom platform for the all terrain vehicle chemical applicator illustrated in FIG. 1, used with a boomless sprayer.

Variations:

Referring to FIG. 6, there is illustrated how chemical applicator mounting platform 44, can be used equally well to stabilize a spray nozzle support on which are mounted a plurality of spray nozzles 49 of a boomless chemical spray system. The construction and operation is in all other respects the same as set forth above and, for that reason, will not be repeated.

Cautionary Warning:

The most convenient mounting location for chemical applicator booms 46 is at rear portion 16 of vehicle 10. However, after having field experience with vehicle 10, it has been determined that in climbing over obstacles vehicle 10 operates like a teeter-totter. Consequently, there is more movement at the extremities of vehicle 10 than there is at a more central position. Although one can obtained beneficial results from a rear mounting, for best results one should use a more central mounting position.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An all terrain vehicle chemical applicator, comprising:
   an elongate frame having opposed sides;
   at least six independent support wheels positioned along the opposed sides of the frame, such that at least four wheels are always in contact with the ground to support the frame;
   suspension for each of the support wheels including a support having a first end and a second end, the first end of the support being pivotally mounted to the frame, one of the support wheels being rotatably mounted to the second end of the support, and at least one air bag disposed between each support and the frame, to absorb shocks as the supports are forced to adjust to variations in terrain, each air bag for each suspension of each support wheel along one of the opposed sides of the frame being in fluid communication with air bags for suspension of other support wheels, such that excess loading on one air bag is transferred to the other air bags along that opposed side;
   a chemical applicator mounting platform pivotally secured to the frame on which are mounted chemical applicators, platform extendible actuators being provided between the chemical applicator mounting platform and the frame to position the chemical applicator mounting platform in an operator selected orientation relative to the terrain; and
   an automatic motion dampening control system dynamically controlling the platform extendible actuators to constantly reposition the chemical applicator mounting platform to dampen disruptive motions and average surface roughness oscillations that can not be dampened by the suspension, control being maintained solely through the platform extendible actuators which rigidly support the chemical applicator mounting platform.

2. An all terrain vehicle chemical applicator, comprising:
   an elongate frame having opposed sides;
   al least six independent support wheels positioned along the opposed sides of the frame, such that at least four wheels are always in contact with the around to support the frame;
   suspension for each of the support wheels including a support having a first end and a second end, the first end of the support being pivotally mounted to the frame, one of the support wheels being rotatably mounted to the second end the support, and at least one shock absorber disposed between each support and the frame, to absorb shocks as the supports are forced to adjust to variations in terrain;

a chemical applicator mounting platform pivotally secured to the frame on which are mounted chemical applicators, platform extendible actuators being provided between the chemical applicator mounting platform and the frame to position the chemical applicator mounting platform in a operator selected orientation relative to the terrain; and an automatic motion dampening control system controlling the platform extendible actuators to dynamically reposition the chemical applicator mounting platform to dampen disruptive motion and average surface roughness oscillations that can not be dampened by the suspension;

a subframe member is pivotally mounted to the frame above each of the supports, the shock absorbers are disposed between the supports and the subframe member, and a fluid activated telescopic preload cylinder acts upon the subframe member to pivot the subframe member into a selected pivotal position, thereby setting basic ride height and clearance.

3. The all terrain vehicle chemical applicator as defined in claim 2, wherein the chemical applicators are spray nozzles of a boomless spray applicator system.

4. The all terrain vehicle chemical applicator as defined in claim 2, wherein the support is an arm.

5. The all terrain vehicle chemical applicator as defined in claim 2, wherein the chemical applicators are spray booms.

6. The all terrain vehicle chemical applicator as defined in claim 2, wherein suspension extendible actuators are provided to adjust a height of the suspension relative to the frame and the at least one shock absorber is at least one air bag which is adapted to absorb shock impacts.

7. The all terrain vehicle chemical applicator as defined in claim 6, wherein there are dual air bags.

8. The all terrain vehicle chemical applicator as defined in claim 6, wherein two or more air bags along one of the opposed sides of the frame are in fluid communication, such that excess loading on one of the air bags is transferred to other of the air bags along that opposed side.

9. The all terrain vehicle chemical applicator as defined in claim 2, wherein the wheels have flotation tires.

10. The all terrain vehicle chemical applicator as defined in claim 2, each supports and its associated subframe member having a common pivot axis.

11. The all terrain vehicle chemical applicator as defined in claim 2 wherein several of the wheels have independent hydraulic drive.

12. The all terrain vehicle chemical applicator as defined in claim 2, wherein the frame has a front portion and a rear portion, a pivoting joint being provided between the front portion and the rear portion which accommodates pivotal movement about a substantially vertical pivot axis, but does not permit relative oscillation of the front portion and the rear portion.

13. An all terrain vehicle chemical applicator, comprising:

an elongate frame having a front portion, a rear portion and opposed sides, a pivoting joint being provided between the front portion and the rear portion which accommodates pivotal movement about a substantially vertical pivot axis, but does not permit relative oscillation of the front portion and the rear portion;

a plurality of subframe members pivotally mounted to the opposed sides of the frame;

at least six independent support wheels positioned along the opposed sides of the frame, such that at least four wheels are always in contact with the ground to support the frame;

an independent hydraulic drive for several of the wheels;

suspension for each of the support wheels including a support arm having a first end and a second end, each support arm being mounted below an associated one of the subframe members with the first end of the support arm being pivotally mounted to the frame co-axially with the associated subframe member, one of the support wheels being rotatably mounted to the second end of the support arm, dual air bag shock absorbers disposed between each support arm and the associated subframe member to absorb shocks as the support arms are forced to adjust to variations in terrain, at least one of the air bag shock absorbers for one of the support arm along one of the opposed sides of the frame being in fluid communication with at least one of the air bag shock absorbers for another of the support arms along one of the opposed sides, such that excess loading on one of the air bag shock absorbers is transferred to other of the air bag shock absorbers along that opposed side;

fluid activated telescopic preload cylinders acting upon each subframe member to pivot the subframe member into a selected pivotal position, thereby setting basic ride height and clearance for each of the support arms;

a chemical applicator mounting platform pivotally secured to the frame on which are mounted chemical applicator booms, several fluid activated telescopic control cylinders being provided to position the chemical applicator mounting platform in an operator selected orientation relative to the terrain; and an automatic motion dampening control system including a controller coupled to the telescopic control cylinders and position sensors, the controller receiving input from the position sensors and activating the telescopic control cylinders to constantly reposition the chemical applicator mounting platform to dampen disruptive motions that would otherwise travel along the chemical applicator booms and to average surface roughness oscillations that can not be dampened by the suspension.

14. The all terrain vehicle chemical applicator as defined in claim 13, wherein the wheels have flotation tires.

* * * * *